(12) United States Patent
Bodtker et al.

(10) Patent No.: US 9,784,327 B2
(45) Date of Patent: Oct. 10, 2017

(54) CENTERING MECHANISM FOR DOUBLE CARDAN JOINTS

(71) Applicant: STEERING SOLUTIONS IP HOLDING CORPORATION, Saginaw, MI (US)

(72) Inventors: Joen C. Bodtker, Gaines, MI (US); Damian Z. Gosztyla, Bay City, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days.

(21) Appl. No.: 14/814,463

(22) Filed: Jul. 30, 2015

(65) Prior Publication Data

US 2016/0047424 A1 Feb. 18, 2016

Related U.S. Application Data

(63) Continuation-in-part of application No. 14/459,917, filed on Aug. 14, 2014.

(51) Int. Cl.
*F16D 47/02* (2006.01)
*F16D 3/42* (2006.01)

(52) U.S. Cl.
CPC ............. *F16D 47/02* (2013.01); *F16D 3/42* (2013.01); *F16D 2250/0084* (2013.01)

(58) Field of Classification Search
CPC ..... F16D 3/42; F16D 47/02; F16D 2250/0084
USPC ......... 464/114, 118, 125, 126; 403/143, 206
See application file for complete search history.

(56) References Cited

U.S. PATENT DOCUMENTS

| 100,868 | A | * | 3/1870 | Cushing | ................ F16C 11/069 |
| | | | | | 403/143 X |
| 724,068 | A | | 3/1903 | Williams | |
| 1,355,516 | A | | 10/1920 | Stahl | |
| 2,133,176 | A | | 12/1936 | Parent | |
| 2,208,314 | A | | 7/1940 | Snyder | |
| 2,712,741 | A | | 7/1955 | Roller | |
| 2,978,886 | A | | 4/1961 | Marquis | |
| 3,296,833 | A | | 1/1967 | McCarthy | |

(Continued)

FOREIGN PATENT DOCUMENTS

| AT | 146861 B | | 8/1936 |
| DE | 41 43 033 A1 | * | 7/1993 |
| FR | 846797 A | | 9/1939 |

*Primary Examiner* — Gregory J Binda
(74) *Attorney, Agent, or Firm* — Cantor Colburn LLP

(57) ABSTRACT

A joint assembly having a first shaft having an end and extending along a first axis and a second shaft having an end and extending along a second axis is provided. A first inner ring coupled to the first shaft, a second inner ring coupled to the second shaft, and a sleeve coupled to the first and second inner rings are also provided. The first and second inner rings are disposed within the sleeve and a centering device engages the ends of the first and second shafts. The centering device is configured to maintain the angular positions of the first and second shafts relative to the sleeve. The centering device is substantially fixed from rotation during rotation of the first and second shafts and the centering device includes a receiving socket defining a socket path, the socket path having a different orientation than the second axis.

12 Claims, 10 Drawing Sheets

(56) References Cited

U.S. PATENT DOCUMENTS

| | | | |
|---|---|---|---|
| 3,375,044 A * | 3/1968 | Peterson | B25G 3/38 403/143 X |
| 3,792,597 A | 2/1974 | Orain | |
| 5,433,667 A | 7/1995 | Schafer et al. | |
| 6,802,275 B2 | 10/2004 | Schmidt | |
| 6,840,864 B2 | 1/2005 | Dupuie et al. | |
| 7,144,325 B2 | 12/2006 | Cornay et al. | |
| 2016/0047423 A1 | 2/2016 | Bodtker | |

\* cited by examiner

CENTERING MECHANISM FOR DOUBLE CARDAN JOINTS

CROSS REFERENCE TO RELATED APPLICATION

This application claims the benefit of U.S. patent application Ser. No. 14/459,917, filed Aug. 14, 2014, the contents of which are incorporated herein by reference thereto.

FIELD OF THE INVENTION

The present disclosure generally relates to joints, more specifically, to centering mechanisms for double universal or cardan joints.

BACKGROUND OF THE INVENTION

It may be desirable to communicate rotation between a first shaft and a second shaft extending away from one another at an angle. The first shaft can be a driving shaft and the second shaft can be a driven shaft. The shafts can be connected to one another with a single universal joint, an arrangement known as a Hooke joint. However, the driven shaft may not rotate at a uniform angular velocity. In particular, during revolution the driven shaft may experience angular acceleration and deceleration in response to relatively constant angular velocity of the driving shaft.

A cardan joint engages two shafts with respect to another with an intermediate, revolving coupling member. First and second universal joints connect the first and second shafts, respectively, to the intermediate coupling member. The cardan joint arrangement imparts constant velocity to the driven shaft. The cardan joint can include a centering plate positioned in the intermediate coupling member that engages both shaft ends to generally maintain the same output angle of the driven shaft as the input angle of the driving shaft with respect to the coupling member. The centering plate can define an aperture for receiving rounded ends of the shafts. Alternatively, the centering plate can define rounded projections receivable in an aperture defined by the shafts.

Use of cardan joints in high joint angle applications may require more space, which may increase size, cost, and friction. Accordingly, it is desirable to provide a simple double joint that can operate at high joint angles.

SUMMARY OF THE INVENTION

In one aspect of the invention, a joint assembly having a first shaft having an end and extending along a first axis is provided. The joint assembly includes a second shaft having an end and extending along a second axis, a first inner ring coupled to the first shaft, a second inner ring coupled to the second shaft, and a sleeve coupled to the first and second inner rings. The first and second inner rings are disposed within the sleeve and a centering device engages the ends of the first and second shafts. The centering device is configured to maintain the angular positions of the first and second shafts relative to the sleeve. The centering device is substantially fixed from rotation during rotation of the first and second shafts and the centering device includes a receiving socket defining a socket path, the socket path having a different orientation than the second axis.

In another aspect of the invention, a double cardan joint comprising a driven shaft having an end and extending along a first axis is provided. The double cardan joint includes a driving shaft having an end and extending along a second axis, a first universal joint coupled to the driven shaft, a second universal joint coupled to the driving shaft, and a sleeve coupled to the first and second universal joints. The first and second universal joints are disposed within the sleeve. A centering device engages the end of the driven shaft and the end of the driving shaft. The centering device is configured to maintain the angular positions of the driven and driving shafts relative to the sleeve. The centering device is substantially fixed from rotation during rotation of the driven and driving shafts and the centering device includes a receiving socket defining a socket path, the socket path having a different orientation than the second axis.

In yet another aspect of the invention, a method of assembling a joint assembly is provided. The method includes providing a first shaft having an end and extending along a first axis and providing a second shaft having an end and extending along a second axis. A first inner ring and a second inner ring and a sleeve are also provided. The first inner ring is rotatably coupled to the sleeve and the first shaft. The first inner ring is disposed within the sleeve and the second inner ring is rotatably coupled to the sleeve and the second shaft. The second inner ring is disposed within the sleeve and a centering device engaging the ends of the first and second shafts is provided. The centering device is configured to maintain the angular positions of the first and second shafts relative to one another. The centering device is substantially fixed from rotation during rotation of the first and second shafts, and the centering device includes a receiving socket defining a socket path, the socket path having a different orientation than the second axis.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
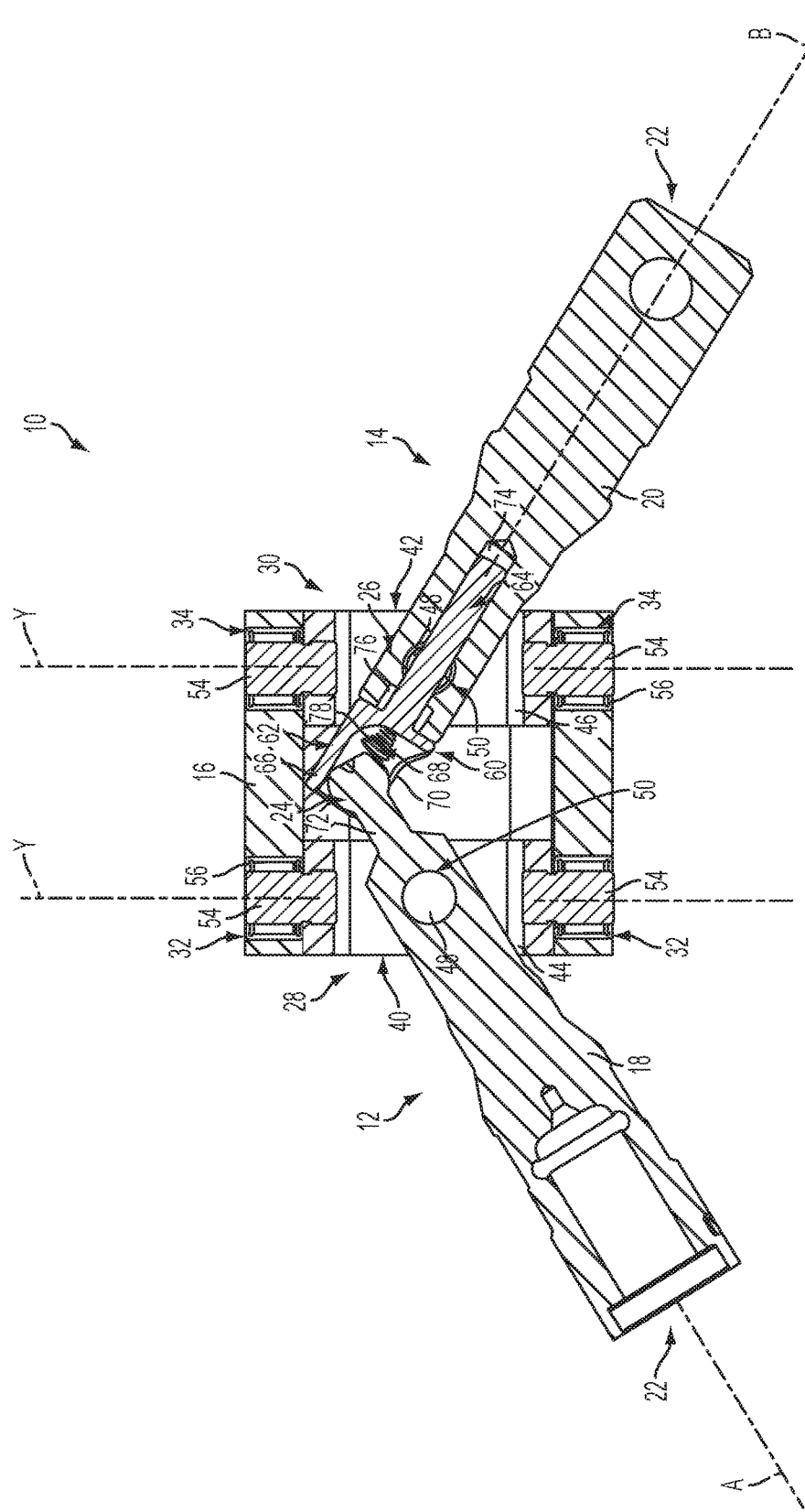
FIG. 1 is a cross-sectional view of an exemplary joint assembly.

Referring now to the Figures, where the invention will be described with reference to specific embodiments, without limiting same, FIGS. 1-4 illustrate an exemplary constant velocity joint assembly 10 that generally includes a first shaft assembly 12 and a second shaft assembly 14 which are joined in articulated, jointed manner by an outer housing or intermediate coupling member or sleeve 16. Torque from shaft assembly 12 is transmitted to second shaft assembly 14 through sleeve 16 through an angle. As explained herein, joint assembly 10 is capable of operating over a range of angles, but for a given application the effective angle between the respective axes of shaft assemblies 12, 14 can be limited to a range about a predetermined angle.

In the exemplary embodiment, constant velocity joint assembly 10 maintains constant velocity at a large joint angle, for example 43° to 83°, while reducing or eliminating any wobbling or lash between the components of joint assembly 10 that are subjected to torque and bending loads in operation. These considerations are achieved in a joint having a small package size.

Figure 2:
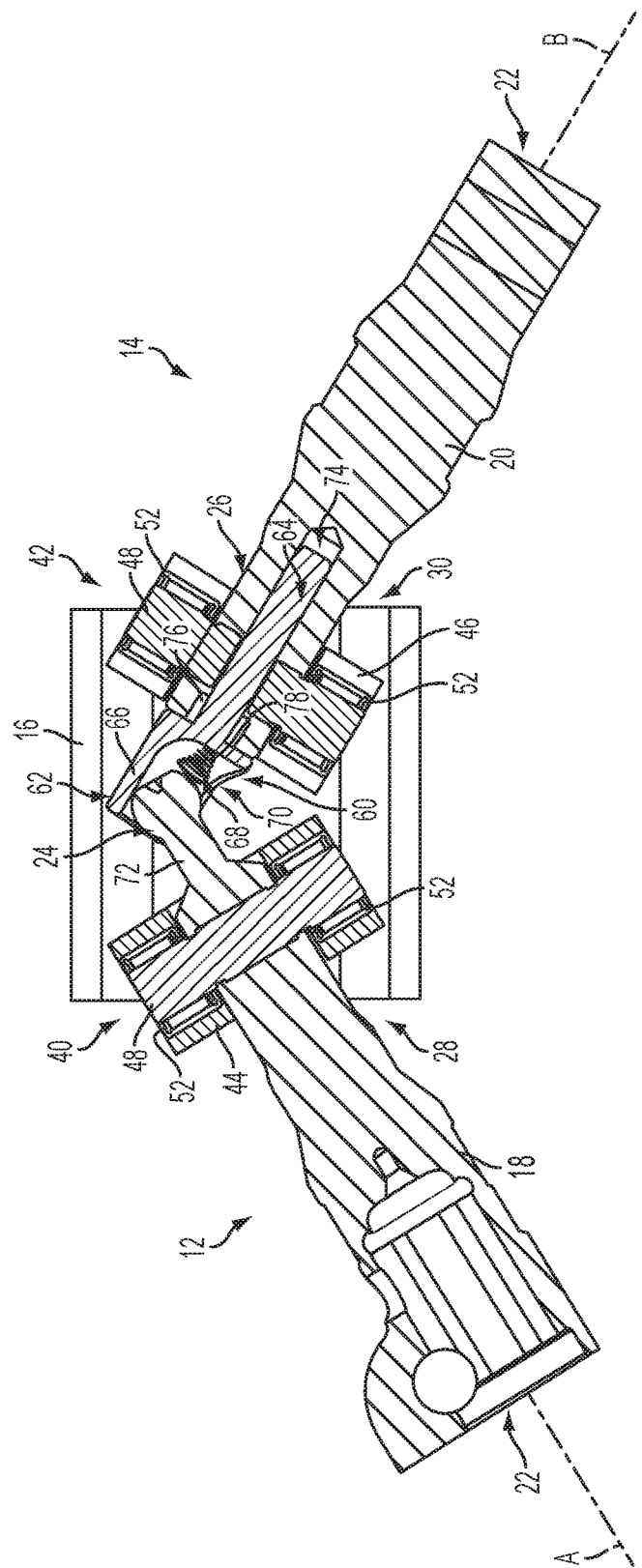
FIG. 2 is another cross-sectional view of the joint assembly shown in FIG. 1.

As illustrated in FIGS. 1-4, shaft assemblies 12, 14 each have respective shafts 18, 20 that extend along respective axes 'A' and 'B' (FIGS. 1 and 2). Shafts 18, 20 are provided at axially outer ends with connecting features 22 which enable the free axial ends of shaft assemblies 12, 14 to be joined to respective driving and driven shafts (not shown) whose axes can be offset at a predetermined, fixed angle (e.g., 63°±20°. In use, the predetermined angle is the angle that axes 'A', 'B' are fixed through the connection of shaft assemblies 12, 14 to the respective shafts (not shown). In this way, joint assembly 10 can operate as an intermediate shaft between the torque-transmitting drive and driven shafts mentioned above. Alternatively, shafts 18, 20 may have a yoke configuration (not shown).

Shaft 18 terminates at its axially inner end in a ball or end 24, and shaft 20 terminates at is axially inner end in an end 26. Inners ends 24, 26 are received within sleeve 16 through opposite open ends 28 and 30. In the exemplary embodiment, sleeve 16 includes a generally cylindrical, open-ended housing having two sets of axially aligned pin holes or openings 32 and 34 (see FIG. 3)

Figure 3:
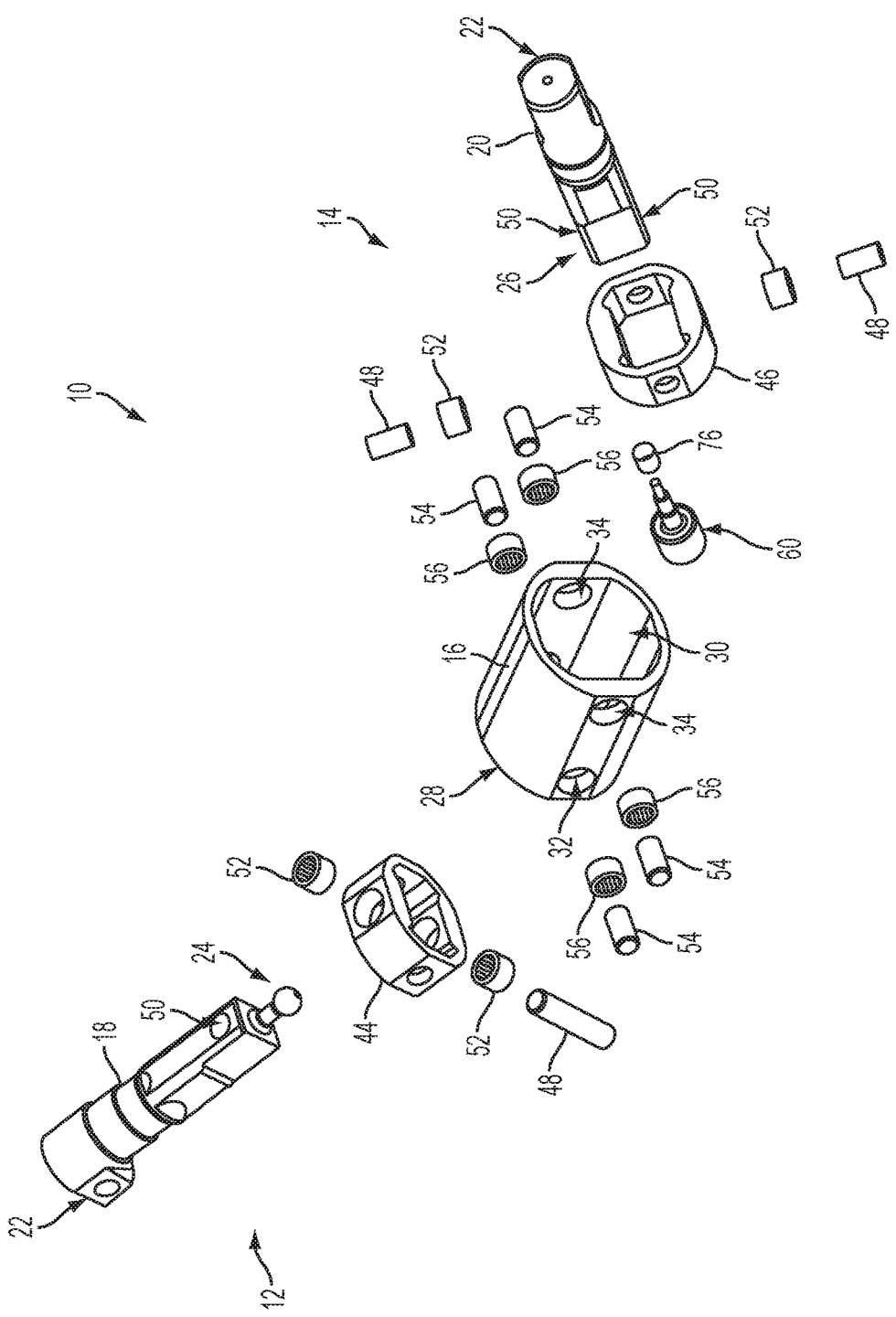
FIG. 3 is an exploded view of the joint assembly shown in FIGS. 1 and 2 before assembly.
Figure 4:
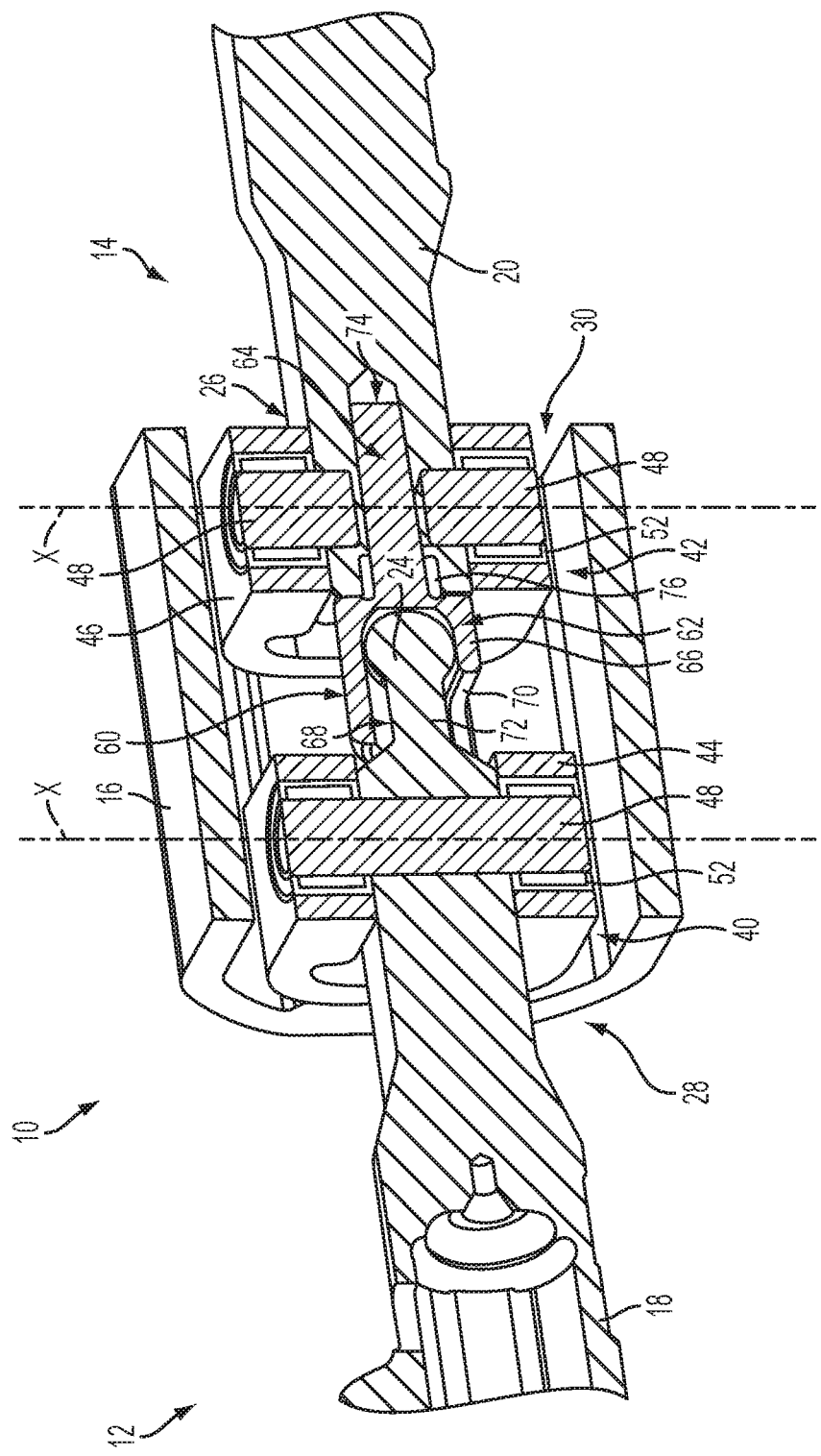
FIG. 4 is a perspective cross-sectional view of the joint assembly shown in FIGS. 1-3.

As illustrated in FIGS. 3 and 4, shaft assembly 12 includes a universal joint 40, and shaft assembly 14 includes a universal joint 42. U-joint 40 includes an inner ring 44, and u-joint 42 includes an inner ring 46. Each ring 44, 46 is arranged concentrically about its respective shaft 18, 20 and is coupled in articulated manner to its respective shaft 18, 20 by means of cross pins 48. Alternatively, rings 44, 46 may be a spider or cross trunnion. As shown in FIG. 4, cross pins 48 extend through a bores 50 in each of shafts 18, 20 and are coupled at their axial free ends by bearings 52 to inner rings 44, 46 such that inner rings 44, 46 are able to pivot about a central axis 'X' of cross pin 48 relative to shaft 18, 20. Each of inner rings 44, 46 carries a set of bearing pins 54, which may be welded or otherwise fixed to inner ring 44, 46 and project outwardly from ring 44, 46 along an axis 'Y' (FIG. 1) which is perpendicular to axis 'X'. Bearings 56 support bearing pins 54 within housing 16. Axes 'Y' lie in the same plane so that axis 'X', 'Y' of each shaft assembly 12, 14 intersect one another and the respective axes 'A', 'B' at a common point.

Bearings pins 54 are received within bearings 56 disposed in bearing or pin holes 32, 34 to enable inner rings 44, 46 to pivot relative to sleeve 16 about the axes 'Y' of bearing pins 54. In this manner, shafts 18, 20 are free to pivot in all directions relative to sleeve 16 and constrained only by contact of shafts 18, 20 with the side walls of rings 44, 46 while being fixed against rotation relative to sleeve 16. In this way, joint assembly 20 is able to transmit torque between shaft assemblies 12, 14 and sleeve 16 through an angle between axes 'A', 'B' of shafts 18, 20.

Referring to FIGS. 1-4, shafts 18, 20 may be fixed relative to one another within sleeve 16 by means of an attachment or centering device 60, which can maintain the angular positions of shafts 18, 20 relative to one another such that in operation, the output angle of the joint is the same as that of the input angle through shaft assemblies 12, 14 relative to sleeve 16. At other joint angles (e.g., deviations from the nominal joint angle), the input angle and output angle relative to sleeve 16 may differ.

In the exemplary embodiment, centering device 60 generally includes a socket portion 62 and a shaft portion 64. Socket portion 62 includes an outer wall 66 defining a receiving socket 68, and a slot 70 formed in outer wall 66. Receiving socket 68 is configured to receive ball 24, and slot 70 is configured to allow a neck 72 of shaft 18 to translate therein, which enables angular adjustment between first shaft 18 and second shaft 20. Centering device shaft portion 64 extends into a bore 74 formed in second shaft 20, which may include a bushing 76, a rolling element bearing (not shown), or the like. As such, centering device 60 is rotatable about axis 'B' within bore 74 and bushing 76. A biasing mechanism 78 such as a spring may be optionally disposed within receiving socket 68 between ball 24 and the inside of receiving socket 68 to axially bias centering device 60 into shaft 20.

Centering device 60 is rotatable with respect to second shaft 20. As such, as the joint rotates at a given joint angle, centering device 60 stays fixed or substantially fixed in place while ball 24 spins inside socket portion 62 in concert with first shaft 18.

Figure 5:
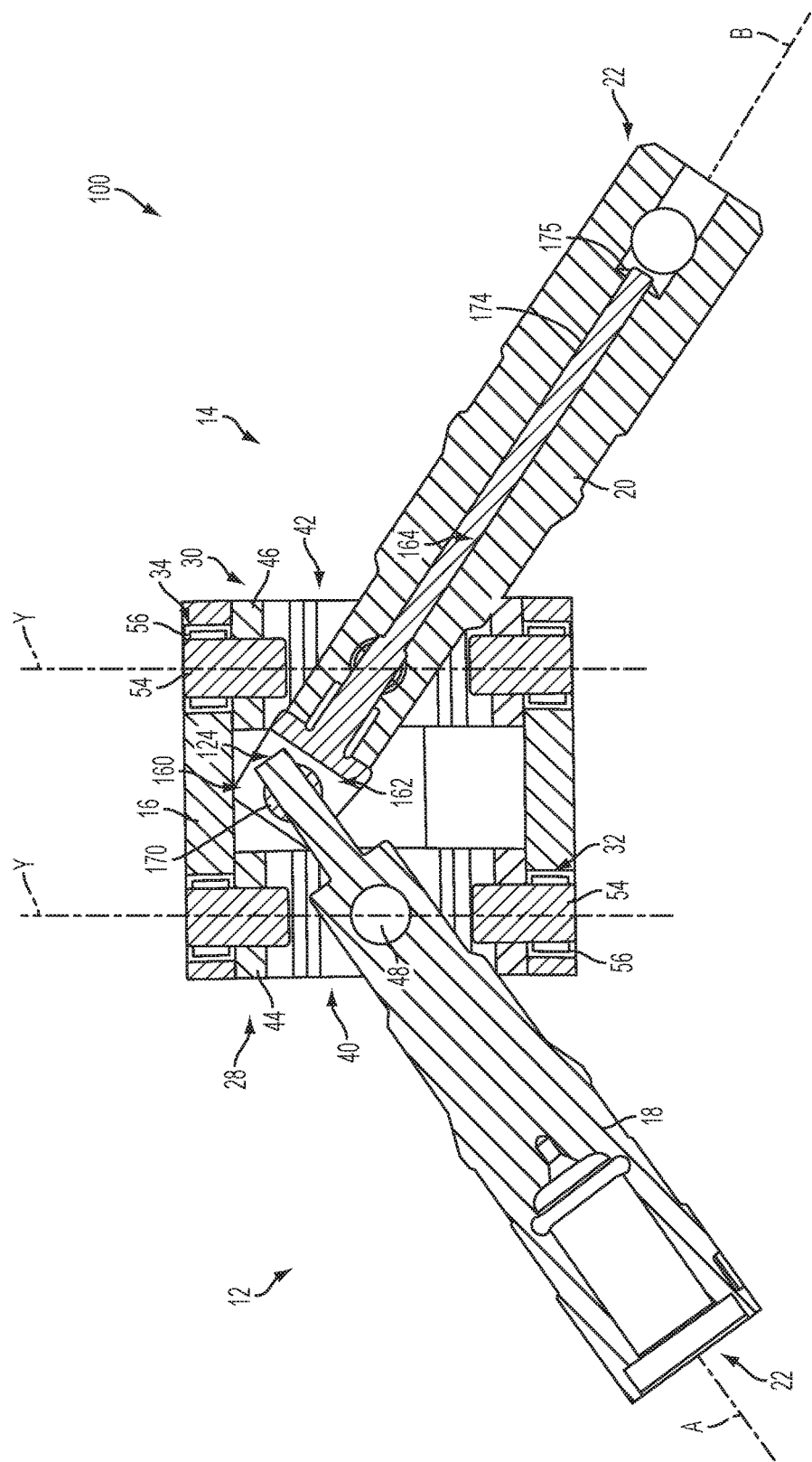
FIG. 5 is a cross-sectional view of another exemplary joint assembly.
Figure 6:
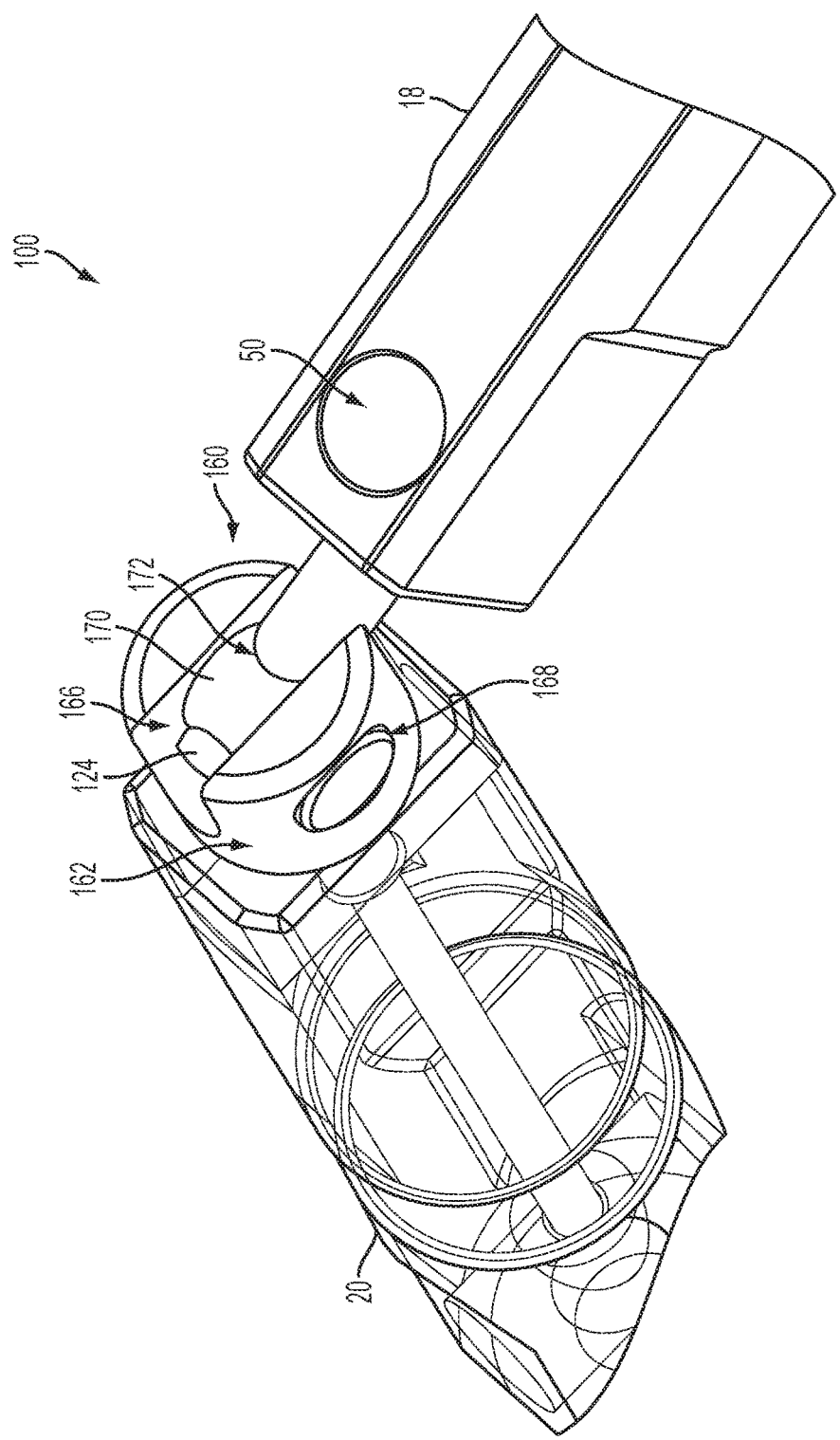
FIG. 6 is a perspective view of a portion of the joint assembly shown in FIG. 5.

FIGS. 5 and 6 illustrate a joint assembly 100 that is similar to joint assembly 10 shown in FIGS. 1-4 except joint assembly 100 includes an attachment or centering device 160 and shaft 18 includes pin 124. In the exemplary embodiment, centering device 160 and pin 124 define a pin and clevis joint, which maintains the angular positions of shafts 18, 20 relative to one another such that in operation, the output angle of the joint is the same as that of the input angle through shaft assemblies 12, 14.

Centering device 160 generally includes a clevis portion 162 and a shaft portion 164. Clevis portion 162 includes an access slot 166, trunnion apertures 168, and a trunnion 170 having a cross aperture 172. Trunnion 170 is disposed within trunnion apertures 168 and pin 124 is inserted into cross aperture 172. As such, access slot 166 enables pin 124 and trunnion 170 to rotate within clevis portion 162, which enables angular adjustment between first shaft 18 and second shaft 20. Centering device shaft portion 164 extends into bore 174 formed in second shaft 20, which may include bushing 76. As such, centering device 160 is rotatable about axis 'B' within bore 174 and bushing 76. A retainer 175 may be optionally disposed within bore 174 and coupled to shaft portion 164 to axially fix centering device 160 to shaft 20, but allow centering device 160 to rotate freely about spin axis 'B' of shaft 20.

Centering device 160 is rotatable with respect to second shaft 20. As such, as the joint rotates at a given joint angle, centering device 160 stays fixed or substantially fixed in place while pin 124 spins inside trunnion 170 in concert with first shaft 18.

Figure 7:
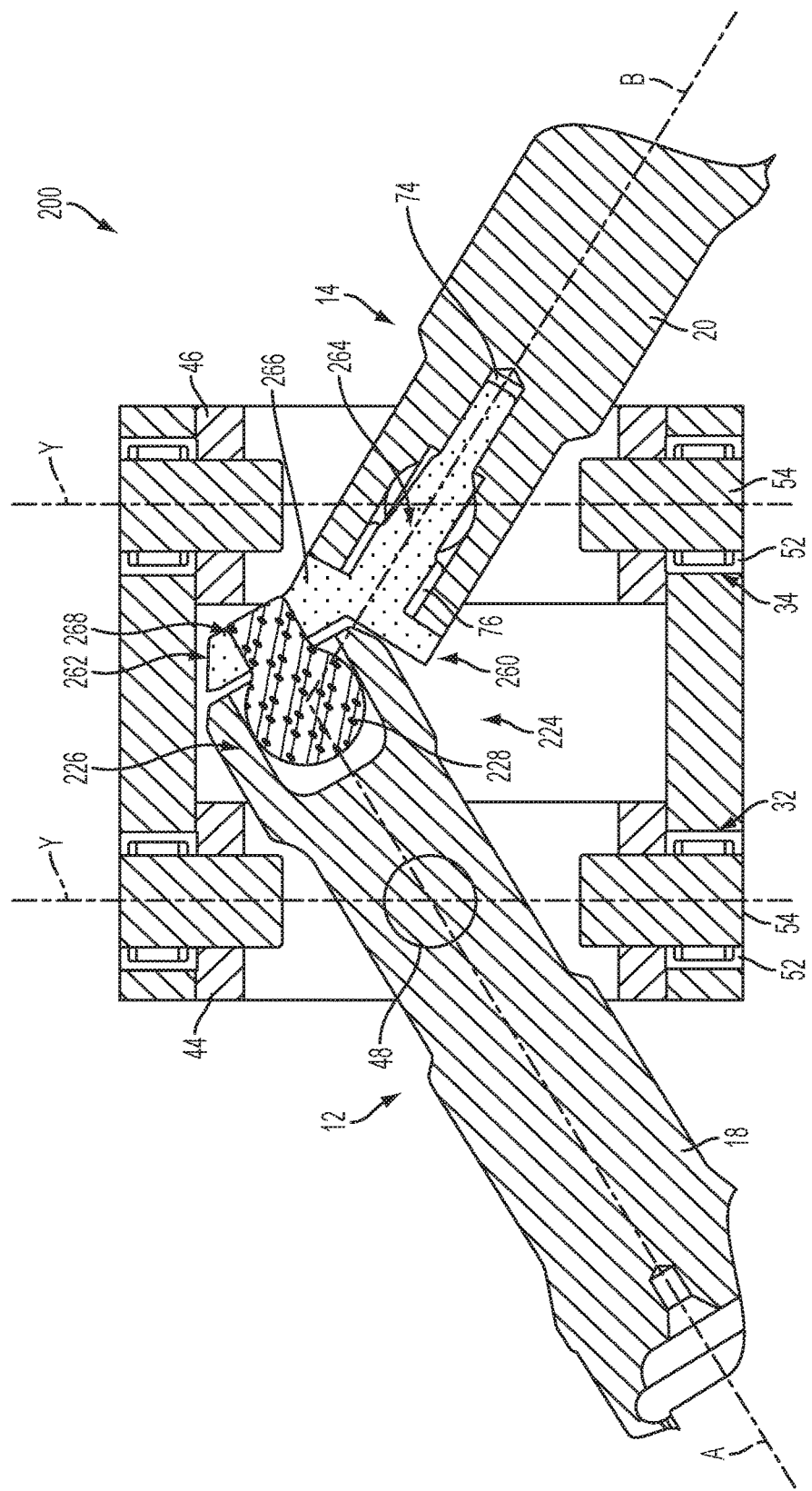
FIG. 7 is a cross-sectional view of yet another exemplary joint assembly.

FIG. 7 illustrates a joint assembly 200 that is similar to joint assembly 10 shown in FIGS. 1-4 except joint assembly 200 includes an attachment or centering device 260 and shaft 18 includes an end 224 having a socket 226. Centering device 260 maintains the angular positions of shafts 18, 20 relative to one another such that in operation, the output angle of the joint is the same as that of the input angle through shaft assemblies 12, 14.

In the exemplary embodiment, centering device 260 generally includes a socket portion 262 and a shaft portion 264. Socket portion 262 includes a plate or base 266 and a ball 268 extending therefrom, which is rotatable within socket 226. Centering device shaft portion 264 extends into bore 74, which may include bushing 76. As such, centering device 260 is rotatable about axis 'B' within bore 74 and bushing 76. In this way, as the joint rotates at a given joint angle, centering device 260 stays fixed or substantially fixed in place while socket 226 rotates within centering device 260 about ball 228 along axis 'A' of first shaft 18.

A method of assembling joint assembly 10, 200 includes providing shafts 18, 20, providing universal joints 40, 42, providing sleeve 16, and providing centering device 60. Universal joints 40, 42 are rotatably coupled to the sleeve 16 and to respective shafts 18, 20 such that universal joints 40, 42 are disposed at least partially within sleeve 16. Centering device 60 is positioned to engage shaft ends 24, 26 to maintain the angular positions of shafts 18, 20 relative to one another. During rotation of shafts 18, 20, centering device 60 is fixed or substantially fixed from rotation relative to shafts 18, 20, and therefore must be free to allow shaft 20 to rotate with respect to centering device 60.

Figure 8:
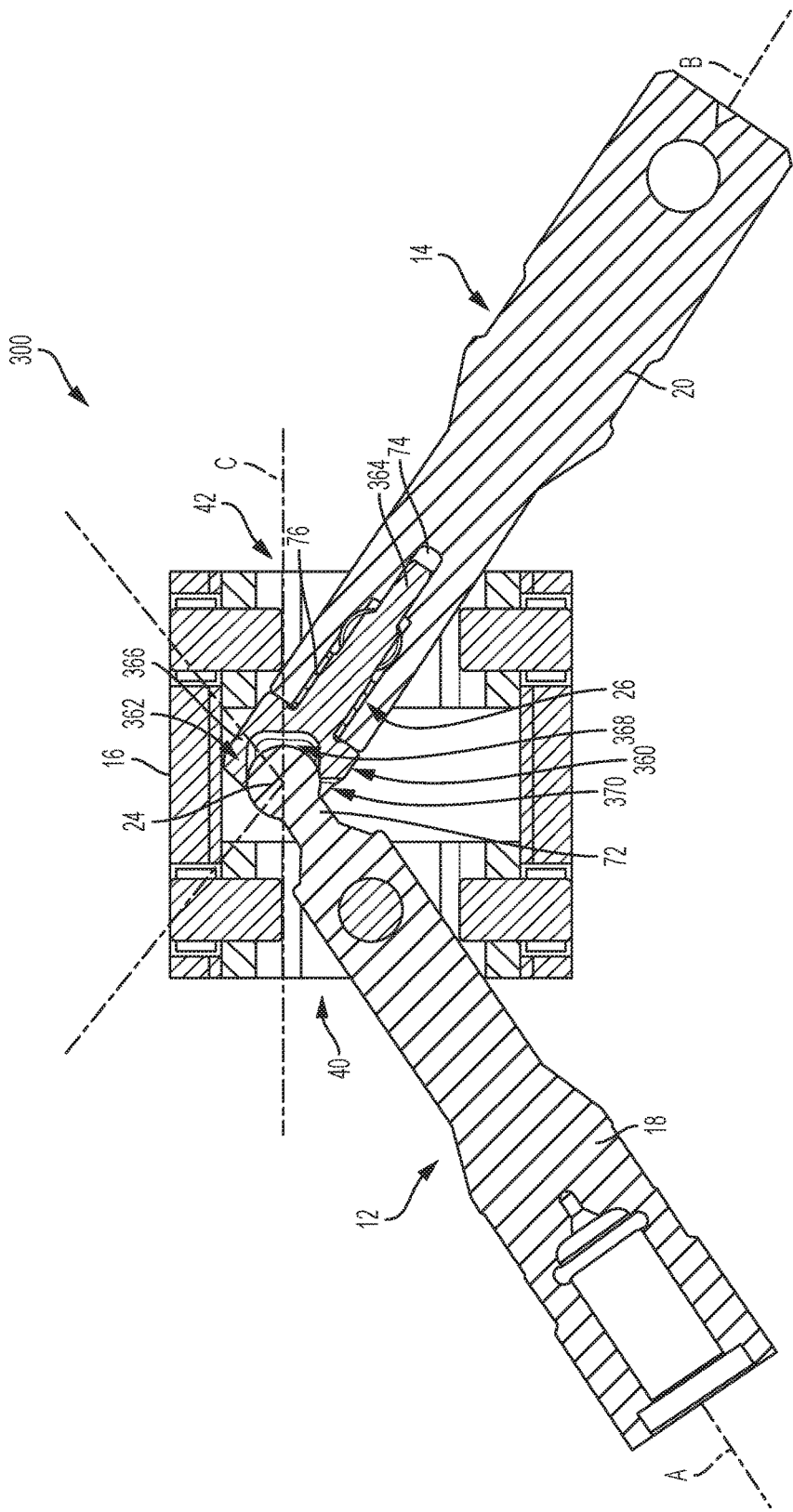
FIG. 8 is a cross-sectional view of yet another exemplary joint assembly.
Figure 9A:
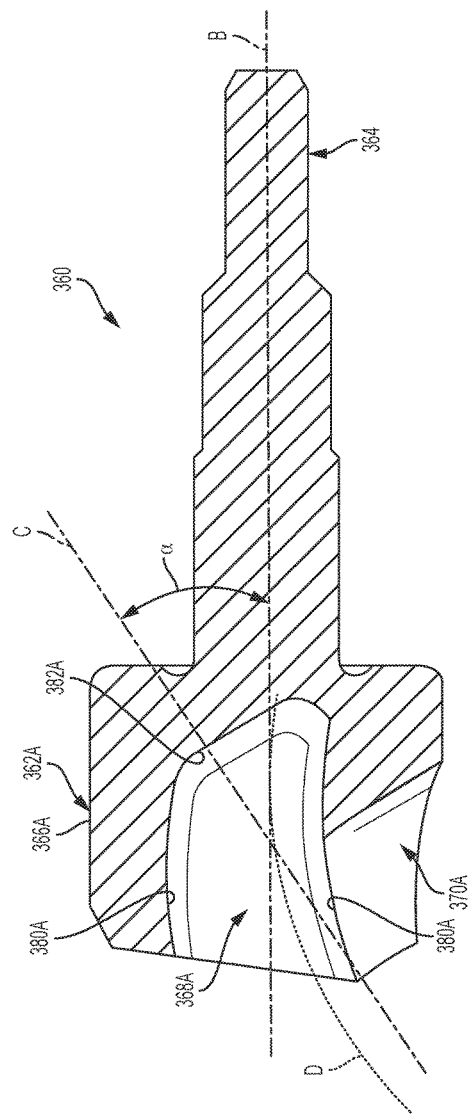
FIGS. 9A and 9B are cross-sectional views of a portion of the joint assembly shown in FIG. 8.
Figure 9B:
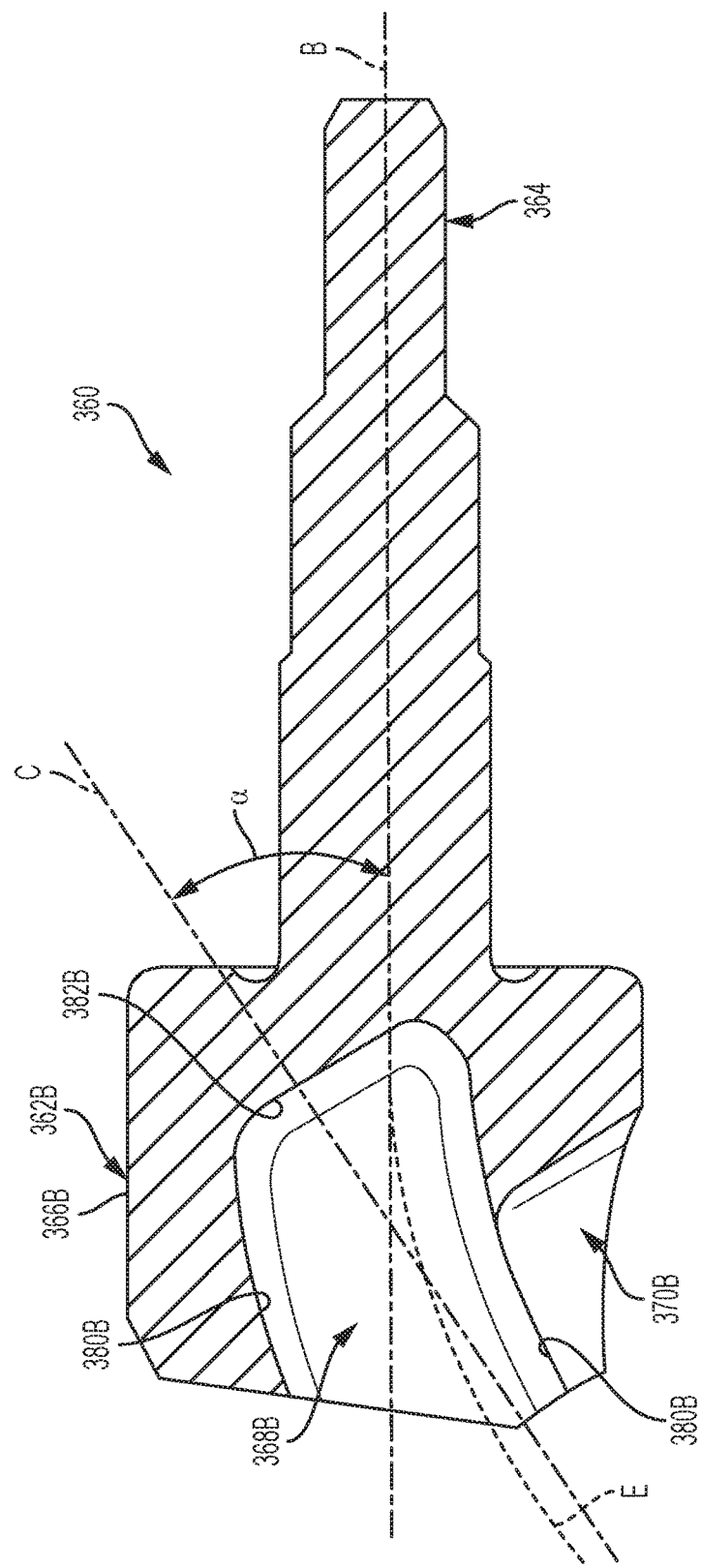

FIGS. 8, 9A, and 9B each illustrate a joint assembly 300 that is similar to joint assembly 10 shown in FIGS. 1-4 except joint assembly 300 includes an attachment or centering device 360. In the exemplary embodiment, centering device 360 maintains the angular positions of shaft 18, 20 relative to one another such that in operation, the output angle of the joint is the same as that of the input angle through shaft assemblies 12, 14.

In the exemplary embodiment, centering device 360 generally includes a socket portion 362, 362A, 362B, and a shaft portion 364. Referring to FIG. 8, socket portion 362 includes an outer wall 366 defining a receiving socket 368, and a slot 370 formed in outer wall 366. Receiving socket 368 is configured to receive ball 24, and slot 370 is configured to allow neck 72 of shaft 18 to translate therein, which enables angular adjustment between first shaft 18 and second shaft 20. Referring to FIG. 9A, socket portion 362A includes an outer wall 366A defining a receiving socket 368A, and a slot 370A formed in outer wall 366A. Receiving socket 368A is configured to receive ball 24, and slot 370A is configured to allow neck 72 of shaft 18 to translate therein, which enables angular adjustment between first shaft 18 and second shaft 20. Referring to FIG. 9B, socket portion 362B includes an outer wall 366B defining a receiving socket 368B, and a slot 370B formed in outer wall 366B. Receiving socket 368B is configured to receive ball 24, and slot 370B is configured to allow neck 72 of shaft 18 to translate therein, which enables angular adjustment between first shaft 18 and second shaft 20.

As shown in FIG. 8, the receiving socket 368 is at least partially defined by an inner wall 380 and an end wall 382. As shown in FIG. 8, the inner wall 380 is linear or substantially linear such that receiving socket 368 defines a socket path that is substantially linear and extends along an axis 'C' along which the ball 24 may travel. As shown in FIG. 9A, the receiving socket 368A is at least partially defined by an inner wall 380A and an end wall 382A. Receiving socket 368A enables ball 24 to travel along axis 'C', which is oriented at a socket path angle '$\alpha$' relative to input shaft axis 'B'. It should be noted that movement along axis 'C' greatly reduces constant velocity error that may be associated with some systems. Inner wall 380A is formed having an arcuate or substantially arcuate profile so as to define an arcuate or substantially arcuate socket path 'D' (FIG. 9A). The arcuate socket path 'D' reduces maximum constant velocity error such that joint assembly 300 operates very near constant velocity in all joint angles beyond the nominal design angle. As shown in FIG. 9B, the receiving socket 368B is at least partially defined by an inner wall 380B and an end wall 382B. Receiving socket 368B enables ball 24 to travel along axis 'C', which is oriented at a socket angle '$\alpha$' relative to input shaft axis 'B'. Inner wall 380B is formed having a parabolic or substantially parabolic profile so as to define a parabolic or substantially parabolic socket path 'E' (FIG. 9B). The parabolic socket path 'E' is a curve synthesized through a set of points that achieves true constant velocity at all joint angles. The parabolic socket path 'E' reduces maximum constant velocity error such that joint assembly 300 operates very near constant velocity in all joint angles beyond the nominal design angle. While centering device 360 is illustrated as applied to double cardan joints, centering device 360 works equally as well in any double universal joint application such as rzeppa, double offset, and cross groove.

As shown in FIG. 8, centering device shaft portion 364 extends into bore 74 formed in second shaft 20, which may include bushing 76, a rolling element bearing (not shown), or the like. As such, centering device 360 is rotatable about axis 'B' within bore 74 and bushing 76. A biasing mechanism (not shown) may be disposed within receiving socket 368 between ball 24 and the inside of receiving socket to axially bias centering device 360 into shaft 20. Centering device 360 is rotatable with respect to second shaft 20. As such, as the joint rotates at a given joint angle, centering device 360 stays fixed or substantially fixed in place while ball 24 spins inside socket portion 362 in concert with first shaft 18.

A method of assembling joint assembly 300 includes providing shafts 18, 20, providing universal joints 40, 42, providing sleeve 16, and providing centering device 360. Universal joints 40, 42 are rotatably coupled to the sleeve 16 and to respective shafts 18, 20 such that universal joints 40, 42 are disposed at least partially within sleeve 16. Centering device 360 is positioned to engage shaft ends 24, 26 to maintain the angular positions of shafts 18, 20 relative to one another. During rotation of the shafts 18, 20, centering device 360 is fixed or substantially fixed from rotation relative to shafts 18, 20, and therefore must be free to allow shaft 20 to rotate with respect to centering device 360. Receiving socket 368 is formed within centering device 360 and is defined at least partially by inner wall 380 Inner wall 380 may be linear to define a linear socket path 'C', arcuate to define an arcuate socket path 'D', or parabolic to define a parabolic socket path 'E'.

Described herein are systems and methods for a double joint assembly. In one embodiment, the double joint assembly may be a double cardan joint or universal joint. The joint assembly includes a centering device that couples first and second rotating shafts and maintains the relative angular positions therebetween. The centering device is disposed within the second shaft, which rotates relative thereto, and the first shaft is rotatable within the centering device. The centering device remains fixed in space while rotary motion is transferred from one shaft to the other.

While the invention has been described in detail in connection with only a limited number of embodiments, it should be readily understood that the invention is not limited to such disclosed embodiments. Rather, the invention can be

Having thus described the invention, it is claimed:

1. A joint assembly comprising:
   a first shaft having an end provided with a ball stud and extending along a first axis;
   a second shaft having an end and extending along a second axis;
   a first inner ring coupled to the first shaft;
   a second inner ring coupled to the second shaft;
   a sleeve coupled to the first and second inner rings, the first and second inner rings disposed within the sleeve; and
   a centering device engaging the ends of the first and second shafts and extending into the second shaft, the centering device configured to maintain the angular positions of the first and second shafts relative to the sleeve, the centering device including a socket portion having an outer wall defining a receiving socket that receives the ball stud and the receiving socket defines a socket path, the socket path having a different orientation than the second axis.

2. The joint assembly of claim 1, wherein the receiving socket receives at least a portion of the first shaft such that the portion is translatable within the receiving socket along the socket path.

3. The joint assembly of claim 1, wherein the socket path is substantially linear.

4. The joint assembly of claim 1, wherein the socket path is substantially arcuate.

5. The joint assembly of claim 1, wherein the socket path is substantially parabolic.

6. The joint assembly of claim 1, wherein the centering device includes a shaft portion that extends from the socket portion and extends into a bore formed in the second shaft.

7. The joint assembly of claim 6, further comprising a bushing disposed in the bore to facilitate rotation of the second shaft about the centering device.

8. The joint assembly of claim 6, wherein the outer wall includes a slot formed therein to provide clearance for a neck of the first shaft end.

9. The joint assembly of claim 1, wherein the first shaft and the second shaft are oriented at an angle relative to one another, the angle being between approximately 43° and approximately 83°.

10. The joint assembly of claim 1, wherein the sleeve receives the first shaft end and the second shaft end through opposite open ends and the sleeve includes axially aligned openings disposed transverse to the opposite open ends.

11. The joint assembly of claim 10, wherein the first inner ring and the second inner ring each carry a bearing pin that is received within bearings disposed in the axially aligned openings.

12. A method of assembling a joint assembly, the method comprising:
   providing a first shaft having an end and extending along a first axis;
   providing a second shaft having an end and extending along a second axis;
   providing a first inner ring and a second inner ring, each carrying a bearing pin that is spaced apart from the first shaft and the second shaft;
   providing a sleeve having two sets of axially aligned openings;
   rotatably coupling the first inner ring to the sleeve and the first shaft, the first inner ring disposed within the sleeve;
   rotatably coupling the second inner ring to the sleeve and the second shaft, the second inner ring disposed within the sleeve;
   receiving each bearing pin within bearings disposed in the axially aligned openings; and
   providing a centering device engaging the ends of the first and second shafts, the centering device configured to maintain the angular positions of the first and second shafts relative to one another, the centering device including a receiving socket defining a socket path, the socket path having a different orientation than the second axis.

* * * * *